(12) United States Patent
Niwa

(10) Patent No.: US 11,088,574 B2
(45) Date of Patent: Aug. 10, 2021

(54) NOTIFICATION SYSTEM AND NOTIFICATION METHOD

(71) Applicant: Toyota Jidosha Kabushiki Kaisha, Toyota (JP)

(72) Inventor: Yamato Niwa, Kariya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 3 days.

(21) Appl. No.: 16/672,844

(22) Filed: Nov. 4, 2019

(65) Prior Publication Data

US 2020/0144868 A1 May 7, 2020

(30) Foreign Application Priority Data

Nov. 6, 2018 (JP) .............................. JP2018-208713

(51) Int. Cl.
*B60L 1/00* (2006.01)
*B60L 3/00* (2019.01)
(Continued)

(52) U.S. Cl.
CPC .............. *H02J 50/60* (2016.02); *B60L 53/12* (2019.02); *B60L 53/305* (2019.02); *H02J 7/025* (2013.01);
(Continued)

(58) Field of Classification Search
CPC .. H02J 50/60; H02J 50/12; H02J 50/80; H02J 7/025; H02J 7/027; H02J 50/90; H02J 7/0047; B60L 53/12; B60L 53/305; B60L 53/38; B60L 53/66; B60L 53/124; B60L 2240/12; B60L 2250/24; B60L 2240/80; B60L 2250/16; B60L 2250/14;
(Continued)

(56) References Cited

U.S. PATENT DOCUMENTS

2014/0139038 A1* 5/2014 Konno .................... B60L 53/68
307/104
2014/0239891 A1* 8/2014 Martin ..................... B60L 3/04
320/108

(Continued)

FOREIGN PATENT DOCUMENTS

JP        2012-249400 A    12/2012
JP        5979125 B2       8/2016

*Primary Examiner* — Richard Tan
(74) *Attorney, Agent, or Firm* — Dinsmore & Shohl LLP

(57) ABSTRACT

The notification system is applicable to a wireless power transfer system configured to transmit power in a wireless manner from a power transmission coil of a power transmission device provided in a parking space to a power reception coil mounted on a vehicle. The notification system includes a display device and a control device. When the distance between the power transmission device and the vehicle is less than a predetermined distance, a wireless communication is established between the power transmission device and the vehicle. After the wireless communication is established between the power transmission device and the vehicle, the control device performs a foreign object detection process to detect whether or not a foreign object is present above the power transmission coil. If a foreign object is detected by the foreign object detection process, the control device displays a foreign object detection image on a screen of the display device.

7 Claims, 10 Drawing Sheets

(51) Int. Cl.
*H02G 3/00* (2006.01)
*H02J 50/60* (2016.01)
*H02J 50/12* (2016.01)
*H02J 50/80* (2016.01)
*H02J 7/02* (2016.01)
*B60L 53/12* (2019.01)
*B60L 53/30* (2019.01)
*H02J 50/90* (2016.01)

(52) U.S. Cl.
CPC .............. *H02J 7/027* (2013.01); *H02J 50/12* (2016.02); *H02J 50/80* (2016.02); *B60Y 2200/91* (2013.01); *B60Y 2300/91* (2013.01); *H02J 50/90* (2016.02)

(58) Field of Classification Search
CPC . B60Y 2300/91; B60Y 2200/91; Y02T 90/12; Y02T 90/14; Y02T 10/7072; Y02T 10/70; Y02T 90/16
USPC .......................................................... 307/9.1
See application file for complete search history.

(56) References Cited

U.S. PATENT DOCUMENTS

2014/0339905 A1* 11/2014 Moritsuka ............... H02J 7/025
    307/104
2016/0272071 A1    9/2016 Taniguchi et al.

* cited by examiner

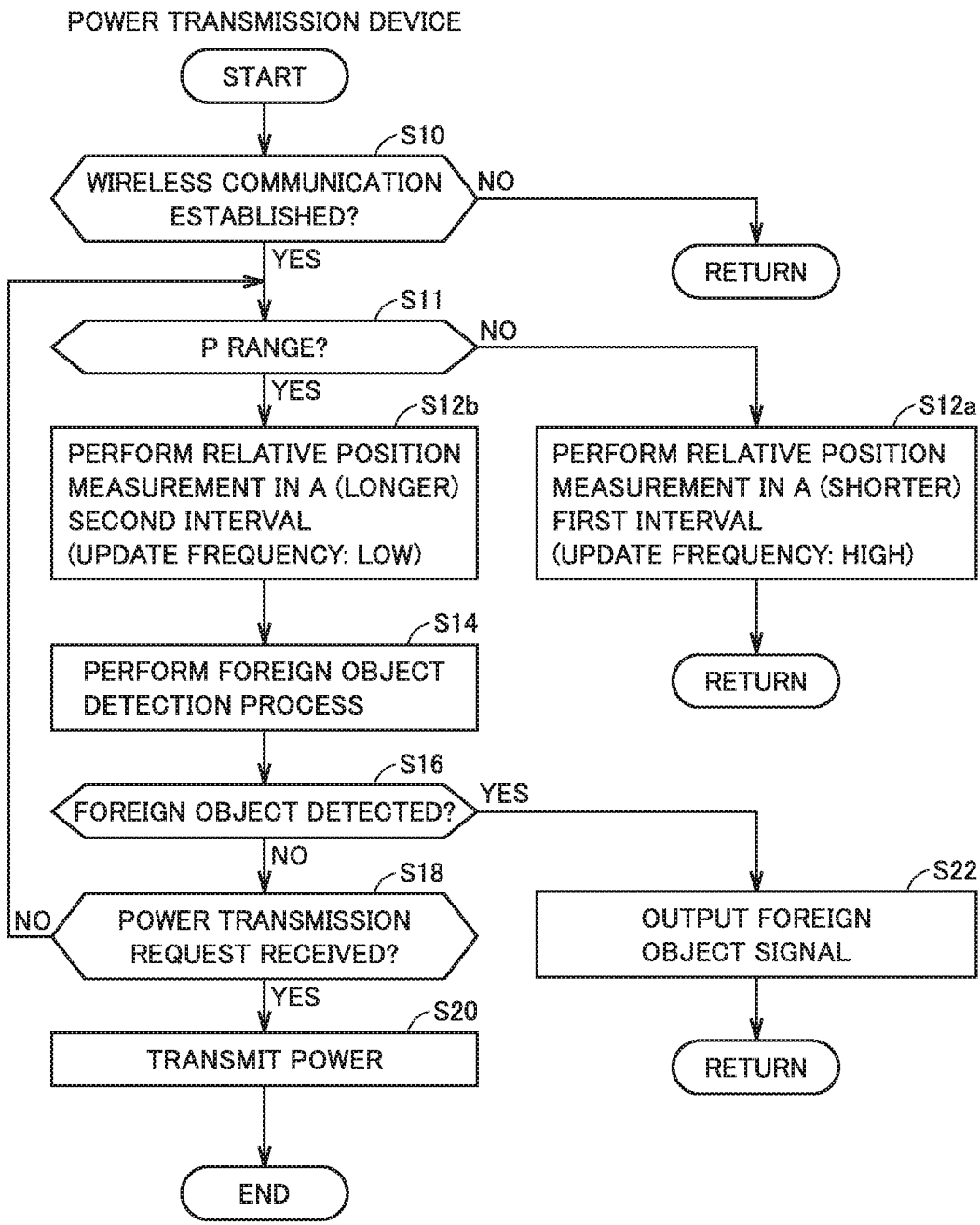

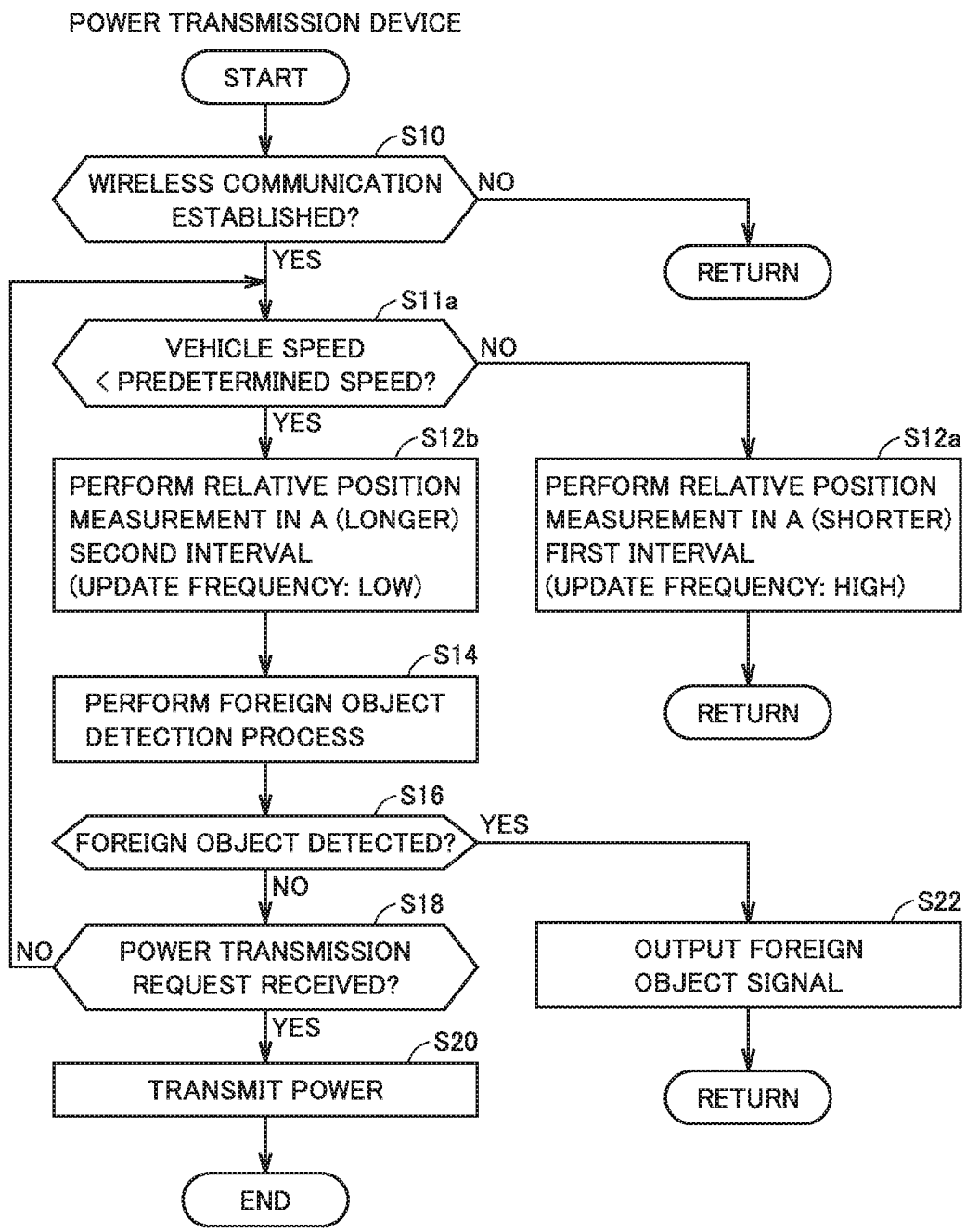

NOTIFICATION SYSTEM AND NOTIFICATION METHOD

CROSS REFERENCE TO RELATED APPLICATIONS

This nonprovisional application claims priority to Japanese Patent Application No. 2018-208713 filed on Nov. 6, 2018 with the Japan Patent Office, the entire contents of which are hereby incorporated by reference.

BACKGROUND

Field

The present disclosure relates to a notification system and a notification method applicable to a wireless power configured to transmit power in a wireless manner from a power transmission coil of a power transmission device provided in a parking space to a power reception coil mounted on a vehicle.

Description of the Background Art

Japanese Patent Laying-Open No. 2012-249400 discloses a system for charging a power storage device mounted on a vehicle by transmitting power in a wireless manner from a power transmission coil of a power transmission device provided in a parking space to a power reception coil mounted on the vehicle. This system includes a detection device configured to detect a foreign object that is present between the power transmission coil and the power reception coil. This system is configured to perform a foreign object detection process by the detection device during the power transmission from the power transmission coil to the power reception coil, and to terminate the power transmission when a foreign object is detected.

SUMMARY

According to the system disclosed above in the Japanese Patent Laying-Open No. 2012-249400, the foreign object detection process is performed during the power transmission. Thus, even though a foreign object is already present when the vehicle is parked at a position capable of receiving power from the power transmission coil, the foreign object detection process will not be performed until the power transmission is started. Therefore, despite that the foreign object may be removed when the user has parked the vehicle, the user is not aware of the foreign object until it is detected after the user gets off the vehicle and the power transmission is started. Due to the presence of the foreign object, the power transmission is terminated. As a result, the power storage device mounted on the vehicle may not be charged properly.

The present disclosure has been made to solve the aforementioned problems, and an object thereof is to restrain the power transmission from being interrupted by a foreign object in a system configured to transmit power in a wireless manner from a power transmission coil to a power reception coil.

(1) A notification system according to the present disclosure is applicable to a wireless power transfer system configured to transmit power in a wireless manner from a power transmission coil of a power transmission device provided in a parking space to a power reception coil mounted on a vehicle. The notification system includes a notification device configured to notify a user of the vehicle of a piece of information, and a controller configured to control the notification device. The power transmission device and the vehicle are configured to establish a wireless communication with each other when the distance between the power transmission device and the vehicle is less than a predetermined distance. The controller is configured to perform a notification process so as to cause the notification device to notify the user of the vehicle of a first information when a foreign object is detected over the power transmission coil at any timing in a duration after the wireless communication is established between the power transmission device and the vehicle and before the user of the vehicle gets off and leaves the vehicle.

According to the notification system mentioned above, when a foreign object is detected at any timing in a duration after the wireless communication is established between the power transmission device and the vehicle by approaching the vehicle toward the power transmission device and before the user gets off and leaves the vehicle, the user of the vehicle is notified of the first information. Thus, before the user gets off and leaves the vehicle, the user may be notified that a foreign object is present over the power transmission coil, prompting the user to remove the foreign object. As a result, it is possible to restrain the power transmission from interrupted by the foreign object.

(2) In one aspect, the first information includes information for notifying the user of the vehicle at least one of an event that it is impossible to transmit power from the power transmission coil and an event that a foreign object is present over the power transmission coil.

According to the above aspect, the user may be indirectly notified that a foreign object is present by notifying the user that it is impossible to transmit power from the power transmission coil, or the user may be directly notified that a foreign object is present.

(3) In one aspect, the wireless power transfer system includes a detection device configured to detect a foreign object that is present over the power transmission coil. The controller is configured to initiate a detection process to determine whether or not a foreign object is present based on an output of the detection device at any timing in a duration after the wireless communication is established between the power transmission device and the vehicle and before the user of the vehicle leaves the vehicle, and perform the notification process when a foreign object is detected by the detection process.

According to the above aspect, the foreign object detection process is performed before the user gets off and leaves the vehicle, and the detection result is notified to the user.

(4) In one aspect, the controller is configured to initiate the detection process when the wireless communication is established between the power transmission device and the vehicle.

According to the above aspect, the foreign object detection process is performed when the wireless communication between the power transmission device and the vehicle is established by approaching the vehicle toward the power transmission device. Thus, if a foreign object is present over the power transmission coil before the vehicle is parked, the user may be notified of the presence of the foreign object before the vehicle is parked.

(5) In one aspect, the controller is configured to initiate the detection process when the first condition is satisfied after the wireless communication is established between the power transmission device and the vehicle. The first condition includes a condition that a shift range of the vehicle is a parking range or a condition that a vehicle speed is less than a predetermined speed.

According to the above aspect, even though the wireless communication is established between the power transmission device and the vehicle, if the first condition is not satisfied, for example, if the vehicle is traveling at a vehicle speed equal to or higher than a predetermined speed, the foreign object detection process may not be performed. As a result, it is possible to reduce the processing load of the controller as compared with the case where the foreign object detection process is always performed when the wireless communication is established.

(6) In one aspect, the controller is configured to perform a measurement process to periodically measure the relative position between the power transmission coil and the power reception coil. In a state where the wireless communication is established between the power transmission device and the vehicle, the controller is configured to perform the measurement process in a first interval when the first condition is not satisfied, and perform the measurement process together with the detection process in a second interval longer than the first interval when the first condition is satisfied. The first condition includes a condition that a shift range of the vehicle is a parking range or a condition that a vehicle speed is less than a predetermined speed.

According to the above aspect, when the vehicle is traveling at a vehicle speed equal to or higher than a predetermined speed (in other words, when the first condition is not satisfied), the measurement process is performed in a relatively short first interval so as to assist parking or the like, but the foreign object detection process is not performed. On the other hand, if the shift range is shifted to the parking range or if the vehicle speed is less than the predetermined speed (in other words, the first condition is satisfied), it is less necessary to perform the parking assistance, and thus the measurement process is performed together with the detection process in a second interval longer than the first interval. Thereby, it is possible to perform the foreign object detection process while reducing the processing load of the controller.

(7) In one aspect, when a control system of the vehicle is deactivated during the notification process, the controller is configured to continuously perform the notification process until a predetermined time has elapsed since the control system of the vehicle is deactivated.

According to the above aspect, even after the control system of the vehicle is deactivated by the user, it is possible to notify the user of the presence of the foreign object.

(8) A notification method according to the present disclosure is applicable to a wireless power transfer system configured to transmit power in a wireless manner from a power transmission coil of a power transmission device provided in a parking space to a power reception coil mounted on a vehicle. The power transmission device and the vehicle are configured to establish a wireless communication with each other when the distance between the power transmission device and the vehicle is less than a predetermined distance. The notification method includes determining whether or not a foreign object is detected over the power transmission coil at any timing in a duration after the wireless communication is established between the power transmission device and the vehicle and before the user of the vehicle gets off and leaves the vehicle; and notifying the user of the vehicle of a first information when it is determined that a foreign object is detected over the power transmission coil.

According to the notification method mentioned above, when a foreign object is detected at any timing in a duration after the wireless communication is established between the power transmission device and the vehicle by approaching the vehicle toward the power transmission device and before the user gets off and leaves the vehicle, the user of the vehicle is notified of the first information. Thus, before the user gets off and leaves the vehicle, the user may be notified that a foreign object is present over the power transmission coil, prompting the user to remove the foreign object. As a result, it is possible to restrain the power transmission from being interrupted by the foreign object.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 9 is a flowchart illustrating another example process to be performed by the power transmission ECU; and FIG. 10 is a flowchart illustrating another example process to be performed by the power transmission ECU.

DETAILED DESCRIPTION

Figure 1:
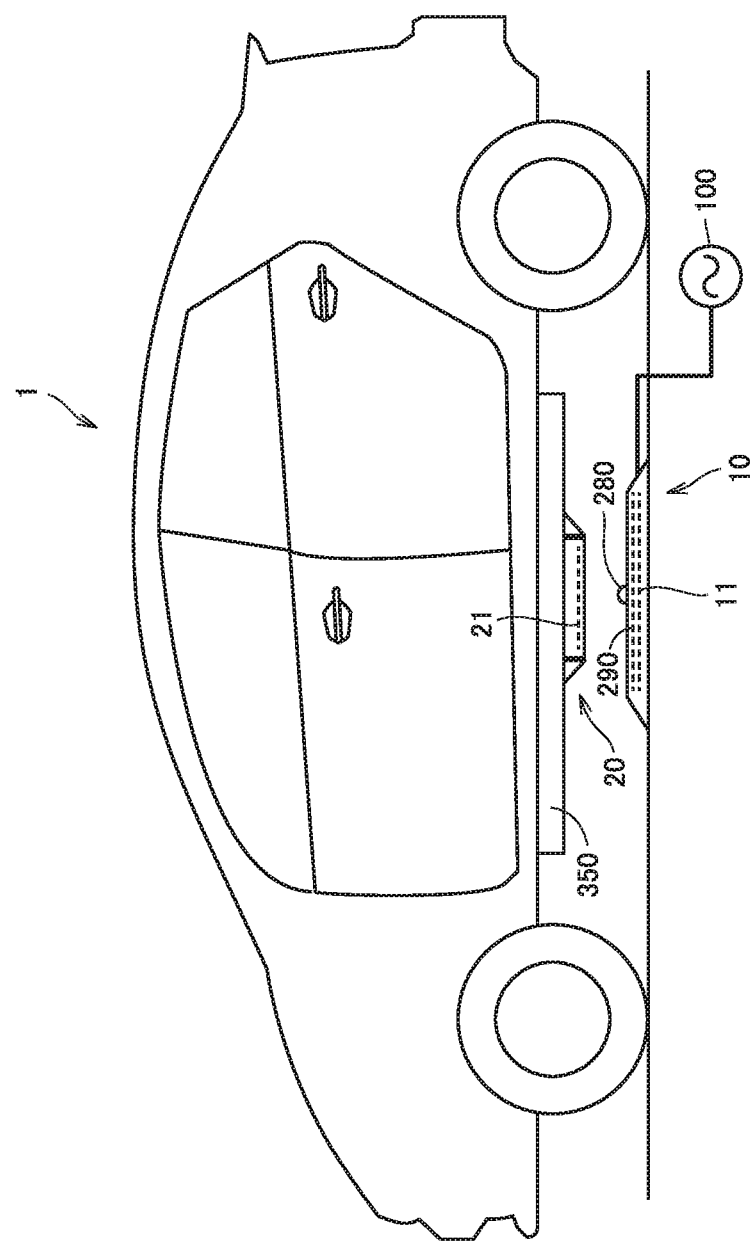
FIG. 1 is an external view of a wireless power transfer system to which a notification system is applied.

Hereinafter, an embodiment of the present disclosure will be described in detail with reference to the drawings. In the drawings, the same or corresponding parts are denoted by the same reference numerals, and the description thereof will not be repeated.

<System Configuration>

FIG. 1 is an external view of a wireless power transfer system to which a notification system according to the present embodiment is applicable. The wireless power transfer system includes a vehicle 1 and a power transmission device 10 equipped with a power transmission coil 11. The vehicle 1 includes a power reception device 20 equipped with a power reception coil 21. The power transmission device 10 is installed in a parking space for parking the vehicle 1. The power reception device 20 is disposed on the bottom surface of the vehicle 1, for example, on a lower surface (facing the road) of a power storage device 350 installed on the bottom surface of the vehicle 1.

The wireless power transfer system is configured to transmit power in a wireless manner from the power transmission coil 11 of the power transmission device 10 to the power reception coil 21 mounted on the vehicle 1. The power transmission device 10 and the vehicle 1 are configured to establish a wireless communication with each other when the vehicle 1 is located at a position within a predetermined range from the parking space where the power transmission device 10 is installed. The vehicle 1 is configured to travel by using the power supplied from the power transmission device 10 and stored in the power storage device 350.

The power transmission device 10 receives power from an AC power supply 100 (for example, a commercial power supply). The power transmission coil 11 of the power transmission device 10 is configured to transmit power in a wireless manner to the power reception coil 21 of the power reception device 20 through a magnetic field when the vehicle 1 is aligned such that the power reception coil 21 of the power reception device 20 faces the power transmission coil 11 of the power transmission device 10.

The power transmission device 10 includes a camera 280. The camera 280 is equipped with a fisheye lens and is disposed substantially at the center of the upper surface of the power transmission device 10. Since the camera 280 is equipped with a fisheye lens, it is possible for it to photograph a wide space including the power reception device 20 when the vehicle 1 is being moved toward the power transmission device 10. An image photographed by the camera 280 is used as information indicating the relative position of the vehicle 1 to the power transmission device 10 when the vehicle 1 is being aligned relative to the power transmission device 10.

The power transmission device 10 further includes a foreign object detection device 290. The foreign object detection device 290 includes a plurality of foreign object detection coils, and is configured to magnetically detect a metal foreign object (such as a beverage can or a coin) when such foreign object is present over the power transmission coil 11 of the power transmission device 10 based on an output voltage of the foreign object detection coils. It should be noted that an image photographed by the camera 280 may also be used as information for detecting whether or not a foreign object is present over the power transmission coil 11 of the power transmission device 10. The foreign object that may be detected by the camera 280 is not limited to a metal object, it may be an animal, for example.

The foreign object detection device 290 or the camera 280 in the present embodiment functions as a detection device according to the present disclosure. In the present embodiment, as an example, the detection device according to the present disclosure is provided in the power transmission device 10. However, the detection device according to the present disclosure is not limited to a device (such as a camera) provided in the power transmission device 10, it may be a device disposed in the parking space where the power transmission device 10 is installed or a device (for example, a front camera or a rear camera) provided in the vehicle 1.

Figure 2:
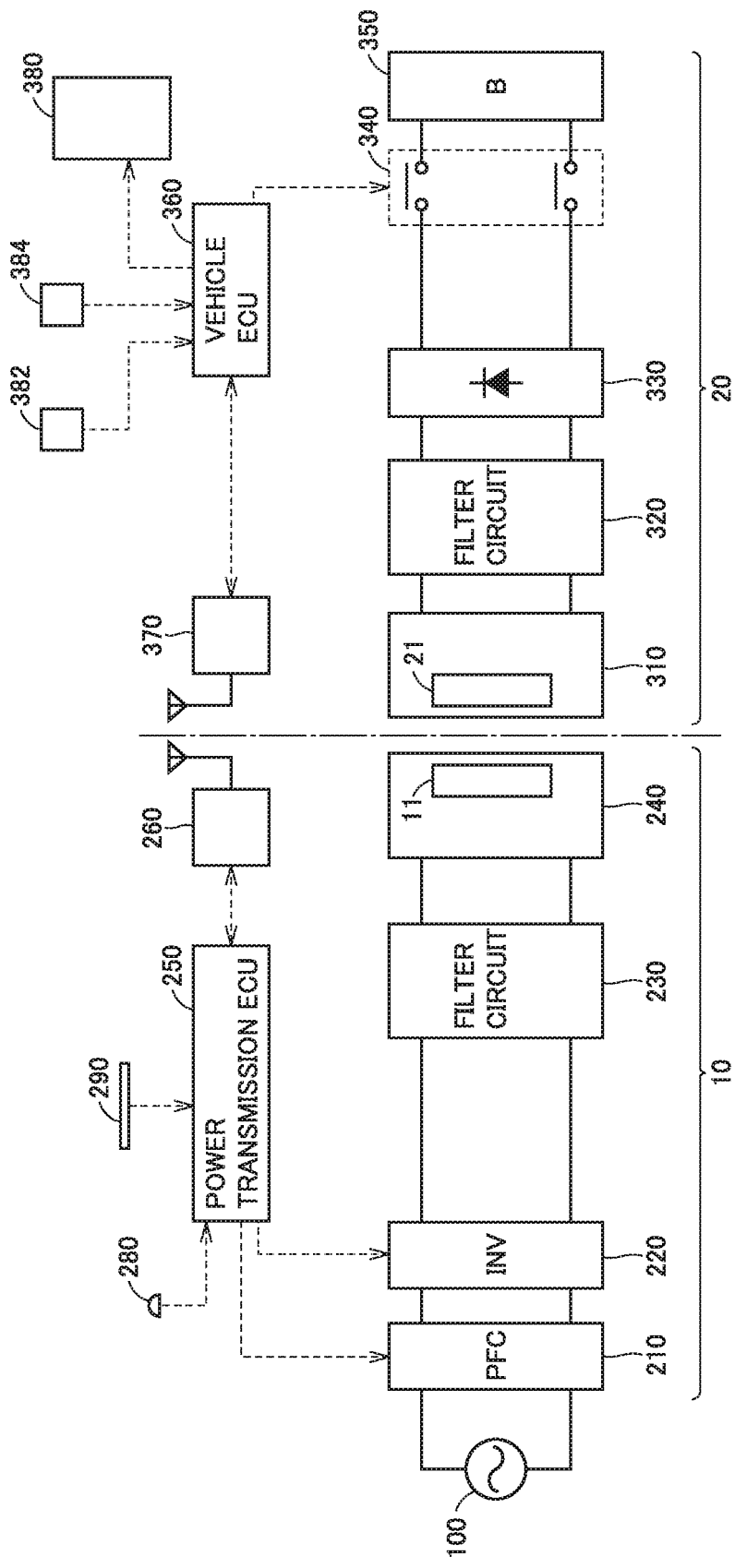
FIG. 2 is a diagram illustrating an overall configuration of a power transmission device and a power reception device.

FIG. 2 is a diagram illustrating an overall configuration of the power transmission device 10 and the power reception device 20. The power transmission device 10 includes a PFC (Power Factor Correction) circuit 210, an inverter 220, a filter circuit 230, a power transmission unit 240 equipped with the power transmission coil 11, a power transmission ECU (Electronic Control Unit) 250, a communication unit 260, the camera 280 and the foreign object detection device 290 mentioned above. The power reception device 20 includes a power reception unit 310 equipped with the power reception coil 21, a filter circuit 320, a rectification unit 330, a relay circuit 340, a power storage device 350, a vehicle ECU 360, a communication unit 370, and a shift position sensor 382, a vehicle speed sensor 384, and a display device 380.

According to the wireless power transfer system, in the power transmission device 10, the power received from the AC power supply 100 such as a commercial power supply is rectified and boosted in the PFC circuit 210 and then supplied to the inverter 220. The inverter 220 converts the power rectified by the PFC circuit 210 into AC power and supplies it to the power transmission unit 240 through the filter circuit 230. Each of the power transmission unit 240 and the power reception unit 310 includes a resonance circuit and is configured to resonate at the frequency of the transmission power.

When the AC power is supplied from the inverter 220 through the filter circuit 230 to the power transmission unit 240, a magnetic field is formed between the power transmission coil 11 of the power transmission unit 240 and the power reception coil 21 of the power reception unit 310, and thereby, the energy (or power) is transferred from the power transmission coil 11 to the power reception coil 21 through the magnetic field. The energy (or power) transferred to the power reception coil 21 is supplied to the power storage device 350 through the filter circuit 320 and the rectification unit 330. Thus, the power storage device 350 is charged.

The power storage device 350 is a rechargeable DC power supply, and includes a secondary battery such as a lithium-ion battery or a nickel-metal hydride battery. The relay circuit 340 is provided between the rectification unit 330 and the power storage device 350. The relay circuit 340 is turned on (or brought into conduction) when the power storage device 350 is to be charged by the power transmission device 10.

The power transmission ECU 250 includes a CPU (Central Processing Unit), a memory, an input/output port for inputting/outputting various signals and the like (none of which is shown), and is configured to receive signals from each sensor and execute a control on various units provided in the power transmission device 10. For example, when the power is to be transmitted from the power transmission device 10 to the power reception device 20, the power transmission ECU 250 performs a switching control on the PFC circuit 210 and the inverter 220. Note that the control is not necessarily processed by software, it may be processed by dedicated hardware (such as an electronic circuit).

The communication unit 260 of the power transmission device 10 and the communication unit 370 of the vehicle 1 (the power reception device 20) are configured to establish a wireless communication (such as WiFi (registered trademark) which is a standard wireless LAN (Local Area Network) between each other when the distance therebetween is less than a predetermined distance. Via the wireless communication established between the power transmission device 10 and the vehicle 1, the communication unit 260 may send information from the power transmission device 10 to the power reception device 20 or receive information from the power reception device 20, and the communication unit 370 may send information from the power reception device 20 to the power transmission device 10 or receive information from the power transmission device 10.

The vehicle ECU 360 is connected to the shift position sensor 382, the vehicle speed sensor 384 and the display device 380.

The shift position sensor 382 is configured to detect a shift range of the vehicle 1 and output the detection result to the vehicle ECU 360. The shift range is selected by the users shift lever operation from a plurality of shift ranges including a forward (D) range, a reverse (R) range, a parking (P) range and a neutral (N) range.

The vehicle speed sensor 384 is configured to detect a vehicle speed of the vehicle 1 and output the detection result to the vehicle ECU 360.

The display device 380 is disposed at a position visible to the user in the vehicle compartment, and configured to display various image information to the user according to a control signal from the vehicle ECU 360. The display device 380 may be, for example, a display of a navigation device, or another display (MID: multi-information display) different from the display of the navigation device, or both.

The display device 380 according to the present embodiment functions as a notification device according to the present disclosure. In the present embodiment, as an example, the notification device according to the present disclosure is provided in the vehicle 1. The notification device according to the present disclosure is not limited to a display device configured to display an image, it may be an audio device (such as a speaker) configured to notify information to a user with a sound or a voice. Furthermore, the notification device according to the present disclosure is not limited to a device provided in the power transmission device 10, it may be, for example, a display or a speaker of a portable terminal (such as a smart phone) held by the user of the vehicle 1.

The vehicle ECU 360 includes a CPU, a memory, an input/output port and the like (none of which is shown), and is configured to receive signals from each of the above-described and perform a control on various units provided in the vehicle 1 including the power reception device 20. Note that the control is not necessarily processed by software, it may be processed by dedicated hardware (such as an electronic circuit).

For example, the vehicle ECU 360 switches the control system of the vehicle 1 to either a Ready-ON state or a Ready-OFF state according to the user's operation. In the Ready-ON state, the power storage device 350 and a drive motor (not shown) are electrically connected, which enables the vehicle 1 to travel. On the other hand, in the Ready-OFF state, the power storage device 350 and the drive motor (not shown) are electrically disconnected, which makes the vehicle 1 unable to travel.

<Power Transmission from Power Transmission Device to Power Reception Device>

Hereinafter, the power transmission from the power transmission device 10 to the power reception device 20 will be described.

When the vehicles 1 approaches toward the power transmission device 10 so that the distance therebetween is less than a predetermined distance, a wireless communication is established between the communication unit 260 and the communication unit 370.

After the wireless communication is established, the power transmission ECU 250 of the power transmission device 10 measures the relative position of the vehicle 1 relative to the power transmission device 10 in a predetermined interval by analyzing images photographed by the camera 280, and sends information indicating the measured relative position (hereinafter also referred to as "relative position information") to the power reception device 20 of the vehicle 1 (hereinafter this process is also referred to as "relative position measurement process").

The measuring method of the relative position is not limited to a method based on images photographed by the camera 280, and various known methods such as a method using a range sensor (an ultrasonic range sensor, a laser range sensor or the like) may be adopted. In addition, although in the present embodiment, the sensor (the camera 280) configured to obtain information for measuring the relative position is provided in the power transmission device 10, the sensor configured to obtain information for measuring the relative position may be, for example, provided in the vehicle 1.

When the relative position information is received from the power transmission device 10 by the communication unit 370 of the vehicle 1, the vehicle ECU 360 displays an image (hereinafter also referred to as "parking assistance image") on the screen of the display device 380 based on the received relative position information so as to assist the parking of the vehicle 1 at a position (hereinafter also referred to as "chargeable position") where the positional deviation between the power transmission device 10 and the power reception device 20 falls within an allowable range (hereinafter this process is also referred to as "parking assistance process"). The user drives the vehicle 1 so as to align (correct the position of) the power transmission device 10 and the power reception device 20 while checking the relative positional relationship between the power transmission device 10 and the power reception device 20 by looking at the parking assistance image displayed on the screen of the display device 380. When the vehicle 1 is parked at the chargeable position, the power transmission ECU 250 determines that the alignment between the power transmission device 10 and the power reception device 20 is completed, and information indicating that the alignment is completed is sent to the vehicle 1.

When the alignment is completed and the control system of the vehicle 1 is switched to the Ready-OFF state according to the user's operation, the vehicle ECU 360 terminates the parking assistance process and stops the display of the parking assistance image on the screen of the display device 380. Thereafter, the vehicle ECU 360 prepares for an external charging which charges the power storage device 350 with the power from the power transmission device 10, and sends a power transmission request to the power transmission device 10 when the preparation is completed.

When the power transmission request from the power reception device 20 is received by the communication unit 260 of the power transmission device 10, the power transmission ECU 250 transmits power to the power reception device 20.

When the power transmission from the power transmission device 10 to the power reception device 20 is initiated, the vehicle ECU 360 performs the external charging, and displays an image with information related to the external charging (for example, the current power amount, the charging completion time or the like) on the screen of the display device 380. Then, when a predetermined charge termination condition is satisfied, the vehicle ECU 360 terminates the charging of the power storage device 350.

<Foreign Object Detection Process and Foreign Object Notification Process>

The power transmission ECU 250 of the power transmission device 10 determines whether or not a foreign object is present over the power transmission coil 11 of the power transmission device 10 based on an output voltage from the foreign object detection device 290 and an image photographed by the camera 280 (hereinafter this process also referred to as "foreign object detection process").

If the power is transmitted from the power transmission coil 11 while a metal foreign object is present over the power transmission coil 11, the foreign object may be overheated by the magnetic flux formed by the power transmission coil 11. Therefore, if a foreign object is detected by the foreign object detection process, it is desirable to suspend the power transmission until the foreign object is removed.

However, if the foreign object detection process is performed after the power transmission is started, even though a foreign object is already present when the vehicle 1 is parked after the alignment of the power transmission device 10 and the power reception device 20 is completed, the foreign object may not be detected by the foreign object detection process until the power transmission is started. Therefore, despite that the foreign object may be removed when the user parks the vehicle 1, the user is not be aware of the foreign object until it is detected after the user leaves the vehicle and the power transmission is started. Due to the presence of the foreign object, the power transmission is terminated. As a result, the external charging may not be performed properly.

Therefore, in the wireless power transfer system according to the present embodiment, when the wireless communication is established between the power transmission device 10 and the vehicle 1, the power transmission ECU 250 initiates the foreign object detection process. When a foreign object is detected by the foreign object detection process, the vehicle ECU 360 displays a specific image (hereinafter also referred to as "foreign object detection image") on the screen of the display device 380 so as to notify the user that a foreign object is detected (hereinafter this process is also referred to as "foreign object notification process"). Thus, the user may be notified that a foreign object is present over the power transmission coil 11 before the user gets off the vehicle 1, prompting the user to remove the foreign object. As a result, it is possible to restrain the external power transmission from being interrupted by the foreign object.

The "foreign object notification process" performed by the vehicle ECU 360 according to the present embodiment corresponds to the "notification process" performed by the controller according to the present disclosure. In other words, the vehicle ECU 360 according to the present embodiment functions as a device (part of the controller) configured to perform the notification process according to the present disclosure. In addition, the device configured to perform the notification process according to the present disclosure is not necessarily limited to be mounted on the vehicle 1. For example, if the notification device is a display or a speaker of a portable terminal held by the user of the vehicle 1, the device configured to perform the notification process according to the present disclosure may be a controller provided in the portable terminal.

The "foreign object detection process" performed by the power transmission ECU 250 according to the present embodiment corresponds to the "detection process" performed by the controller according to the present disclosure. In other words, the power transmission ECU 250 according to the present embodiment functions as a device (part of the controller) configured to perform the detection process according to the present disclosure. The device configured to perform the detection process according to the present disclosure is not necessarily limited to be provided in the power transmission device 10. For example, if the detection device according to the present disclosure is provided in the vehicle 1, the device configured to perform the detection process according to the present disclosure may be the vehicle ECU 360 mounted on the vehicle 1.

The "relative position measurement process" performed by the power transmission ECU 250 according to the present embodiment corresponds to the "measurement process" performed by the controller according to the present disclosure. In other words, the power transmission ECU 250 according to the present embodiment functions as a device (part of the controller) configured to perform the measurement process according to the present disclosure. The device configured to perform the measurement process according to the present disclosure is not necessarily limited to be provided in the power transmission device 10, and it may be the vehicle ECU 360 mounted on the vehicle 1, for example.

Figure 3:
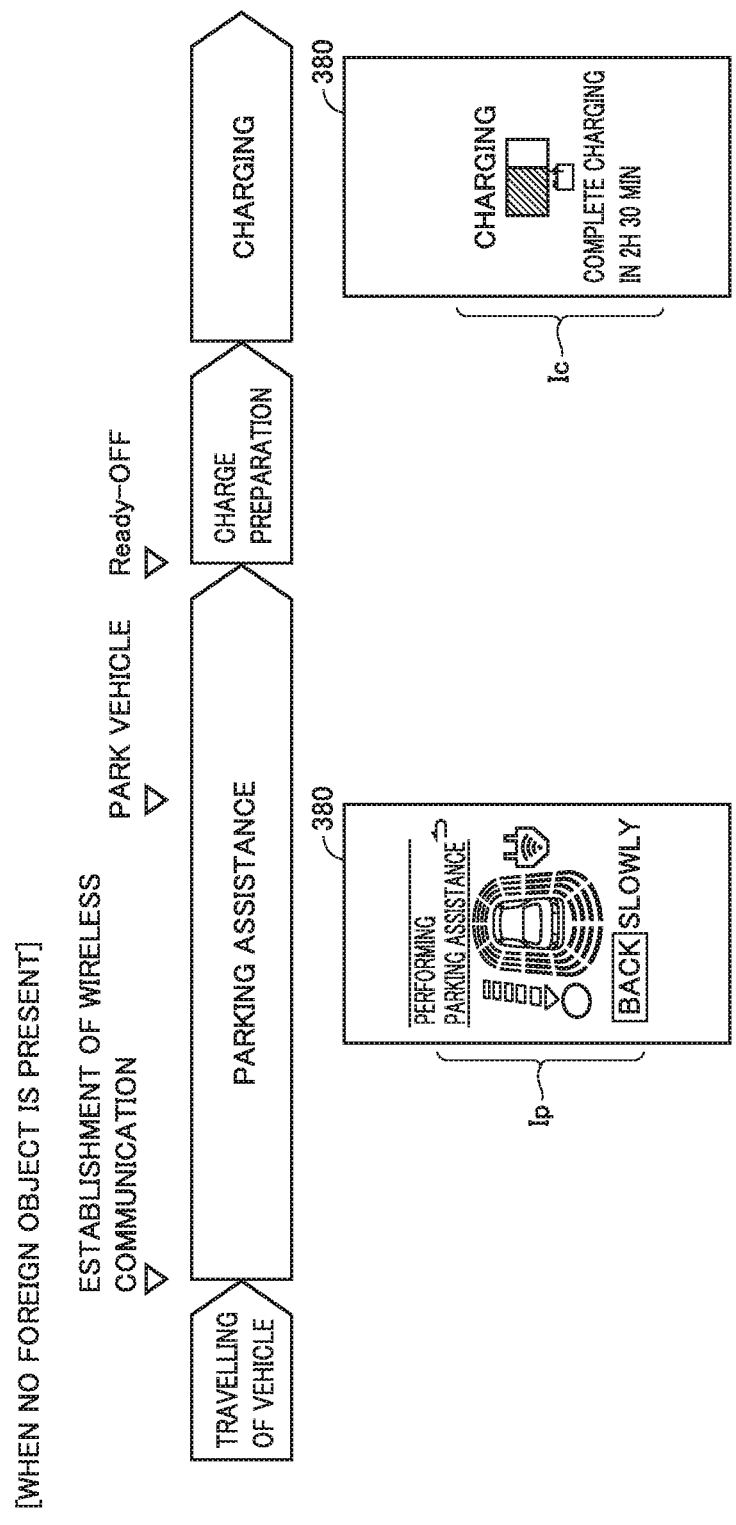
FIG. 3 is a diagram illustrating an example of screen transition of a display device when no foreign object is present over the power transmission coil.

FIG. 3 is a diagram illustrating an example of screen transition of the display device 380 when the vehicle 1 is parked at the chargeable position with no foreign object present over the power transmission coil 11.

When the wireless communication is established between the vehicle 1 and the power transmission device 10 by approaching the vehicle 1 toward the power transmission device 10, the above-mentioned parking assistance process is performed in the vehicle 1, and a parking assistance image Ip is displayed on the screen of the display device 380 of the vehicle 1. The parking assistance image Ip includes at least an image that is used to perform the parking assistance for the user (driver) of the vehicle 1. In the example illustrated in FIG. 3, the parking assistance image Ip includes, for example, an image (on the left side of the screen) indicating an amount of deviation of the vehicle 1 relative to the chargeable position in the anteroposterior direction, an image (in the middle of the screen) indicating the presence or absence of a foreign object around the vehicle 1, an image (on the right side of the screen) indicating the state of wireless connection, and an image (on the bottom of the screen) indicating the driving instructions (the characters such as "back slowly") to the user.

Thus, the user may drive the vehicle 1 so as to park the vehicle at the chargeable position by looking at the parking assistance image Ip, which makes it possible to park the vehicle 1 smoothly.

Although the foreign object detection process is performed in the power transmission device 10 when the wireless communication with the vehicle 1 is established, in the example illustrated in FIG. 3, since no foreign object is present over the power transmission coil 11, no foreign object detection image is displayed on the screen of the display device 380 of the vehicle 1.

Thus, when the vehicle 1 is parked at the chargeable position and the control system of the vehicle 1 is switched to the Ready-OFF state according to the user's operation, the preparation for external charging is performed such as switching the relay circuit 340 to the ON state (conductive state). After the preparation for external charging is completed, the external charging is initiated, and an image Ic indicating information about the external charging is displayed on the screen of the display device 380.

Figure 4:
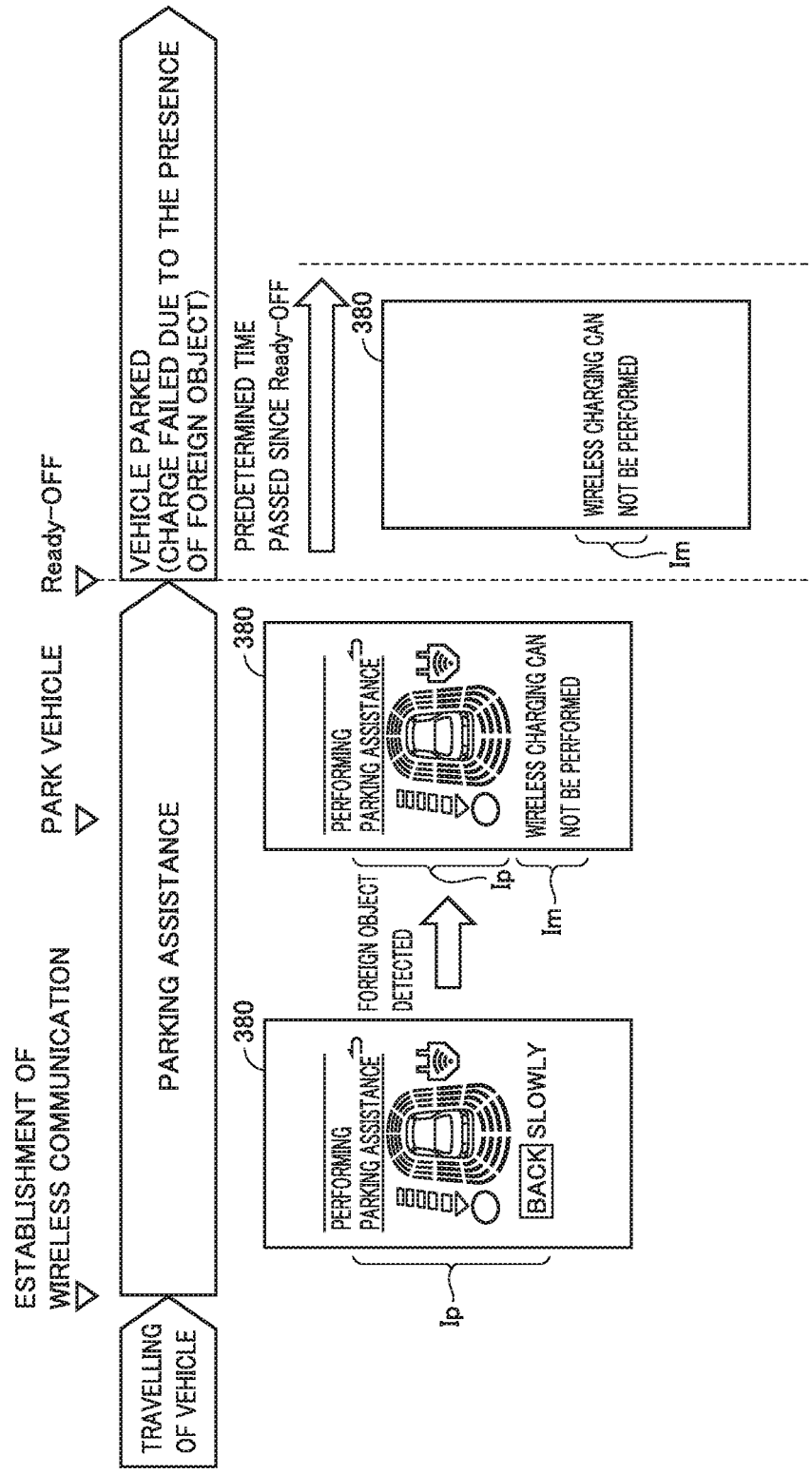
FIG. 4 is a diagram illustrating an example of screen transition of the display device when a foreign object is present over the power transmission coil.

FIG. 4 is a diagram illustrating an example of screen transition of the display device 380 when the vehicle 1 is parked at the chargeable position with a foreign object present over the power transmission coil 11.

When the wireless communication is established between the vehicle 1 and the power transmission device 10, the parking assistance process described above is performed in the vehicle 1, and a parking assistance image Ip is displayed on the screen of the display device 380 of the vehicle 1 as in the case illustrated in FIG. 3.

When the wireless communication with the vehicle 1 is established, the foreign object detection process is performed in the power transmission device 10. When a foreign object is detected by the foreign object detection process, a foreign object signal is sent from the power transmission device 10 to the vehicle 1. Thus, in addition to the parking assistance image Ip, a foreign object detection image Im is displayed on the screen of the display device 380 by the foreign object notification process. In the example illustrated in FIG. 4, a part (the characters such as "back slowly") of the parking assistance image Ip is not displayed, and instead, an image containing characters such as "wireless charging can not be performed" is displayed as the foreign object detection image Im. By displaying the foreign object detection image Im on the screen of the display device 380, it is possible to indirectly notify the user that a foreign object is present over the power transmission coil 11, prompting the user to remove the foreign object.

Note that the example foreign object detection image Im illustrated in FIG. 4 notifies that the wireless charging can not be performed (in other words, the power can not be transmitted from the power transmission coil 11) instead of directly notifying that a foreign object is present over the power transmission coil 11. However, instead of or in addition to the contents illustrated in FIG. 4, the foreign object detection image Im may include an indication that directly notifies that a foreign object is present over the power transmission coil 11. Thereby, the user may be notified of the presence of the foreign object directly.

Further, in the example of FIG. 4, when a foreign object is detected, both the parking assistance image Ip and the foreign object detection image Im are displayed. However, it is acceptable to display only the foreign object detection image Im without displaying the parking assistance image Ip when a foreign object is detected.

After that, when the vehicle 1 is parked at the chargeable position and the control system of the vehicle 1 is switched to the Ready-OFF state according to the user's operation, the display of the parking assistance image Ip is stopped, and the foreign object detection image Im is continued to be displayed until a predetermined time has passed since the control system is switched to the Ready-OFF state. Thus, the user may be notified of the presence of the foreign object even after the control system is switched to the Ready-OFF state.

When the user is aware of the presence of the foreign object after looking at the foreign object detection image Im, gets off the vehicle 1 and removes the foreign object, the foreign object can not be detected, and thereby, no foreign object signal is sent from the power transmission device 10 to the vehicle 1. Thus, the preparation for external charging is performed, and the external charging is initiated after the preparation is completed. As a result, it is possible to restrain the external charging from being interrupted by the foreign object.

<Control Flowchart>

Figure 5:
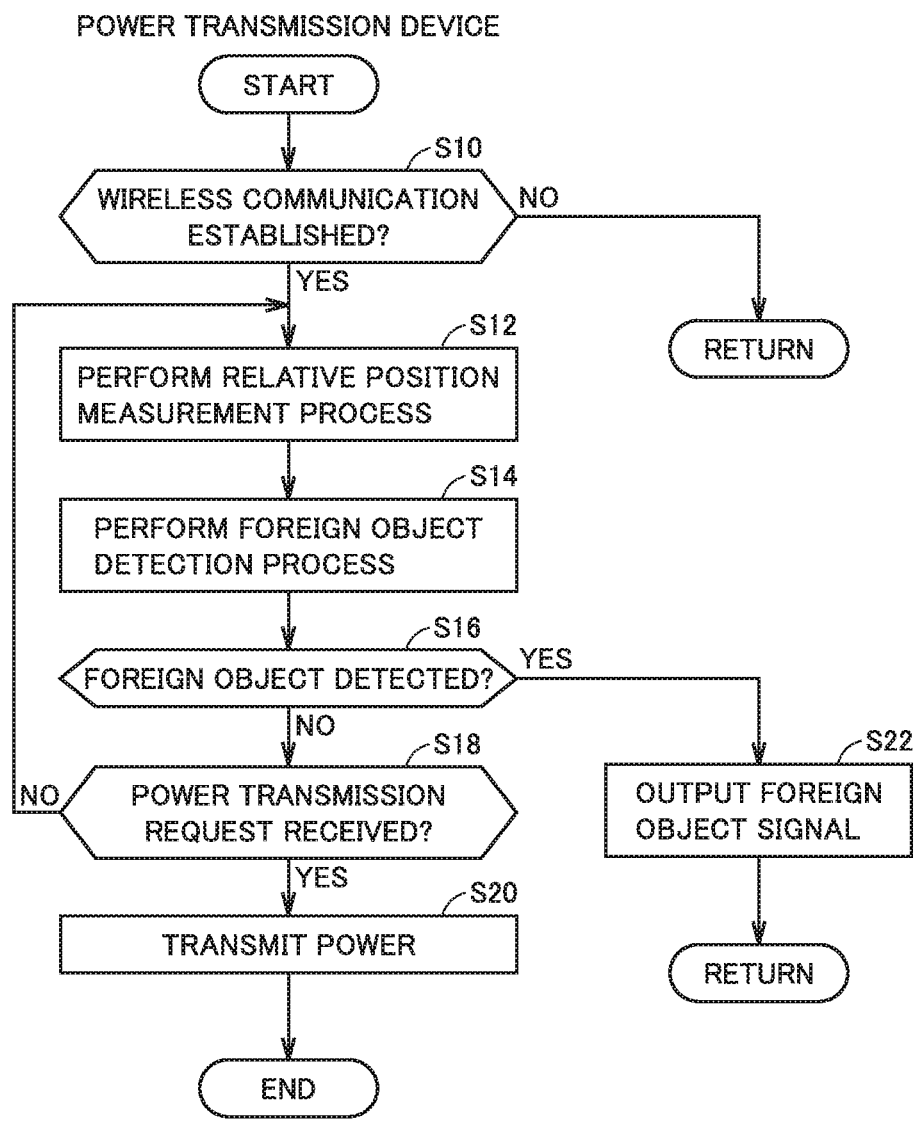
FIG. 5 is a flowchart illustrating an example process to be performed by a power transmission ECU.

FIG. 5 is a flowchart illustrating an example process to be performed by the power transmission ECU 250 of the power transmission device 10.

The power transmission ECU 250 determines whether or not the wireless communication with the vehicle 1 is established (step S10). If it is determined that the wireless communication with the vehicle 1 is not established (NO in step S10), the power transmission ECU 250 skips the subsequent steps and advances the procedure to return.

If it is determined that the wireless communication with the vehicle 1 is established (YES in step S10), the power transmission ECU 250 performs the relative position measurement process described above (step S12). In other words, the power transmission ECU 250 detects (calculates) the relative position in a predetermined interval by analyzing images photographed by the camera 280, and sends the information about the relative position to the power reception device 20 of the vehicle 1.

Then, the power transmission ECU 250 performs the foreign object detection process described above (step S14). In other words, the power transmission ECU 250 detects a foreign object above the power transmission coil 11 based on an output voltage from the foreign object detection device 290 and an image photographed by the camera 280.

Next, the power transmission ECU 250 determines whether or not a foreign object is detected by the foreign object detection process (step S16).

If it is determined that a foreign object is detected (YES in step S16), the power transmission ECU 250 sends a foreign object signal to the vehicle 1 (step S22). Thereafter, the power transmission ECU 250 advances the procedure to return.

On the other hand, if it is determined that no foreign object is detected (NO in step S16), the power transmission ECU 250 determines whether or not a power transmission request is received from the vehicle 1 (step S18). If it is determined that a power transmission request is not received (NO in step S18), the power transmission ECU 250 returns the procedure to step S12.

If it is determined that a power transmission request is received (YES in step S18), the power transmission ECU 250 transmits power from the power transmission coil 11 (step S20).

Figure 6:
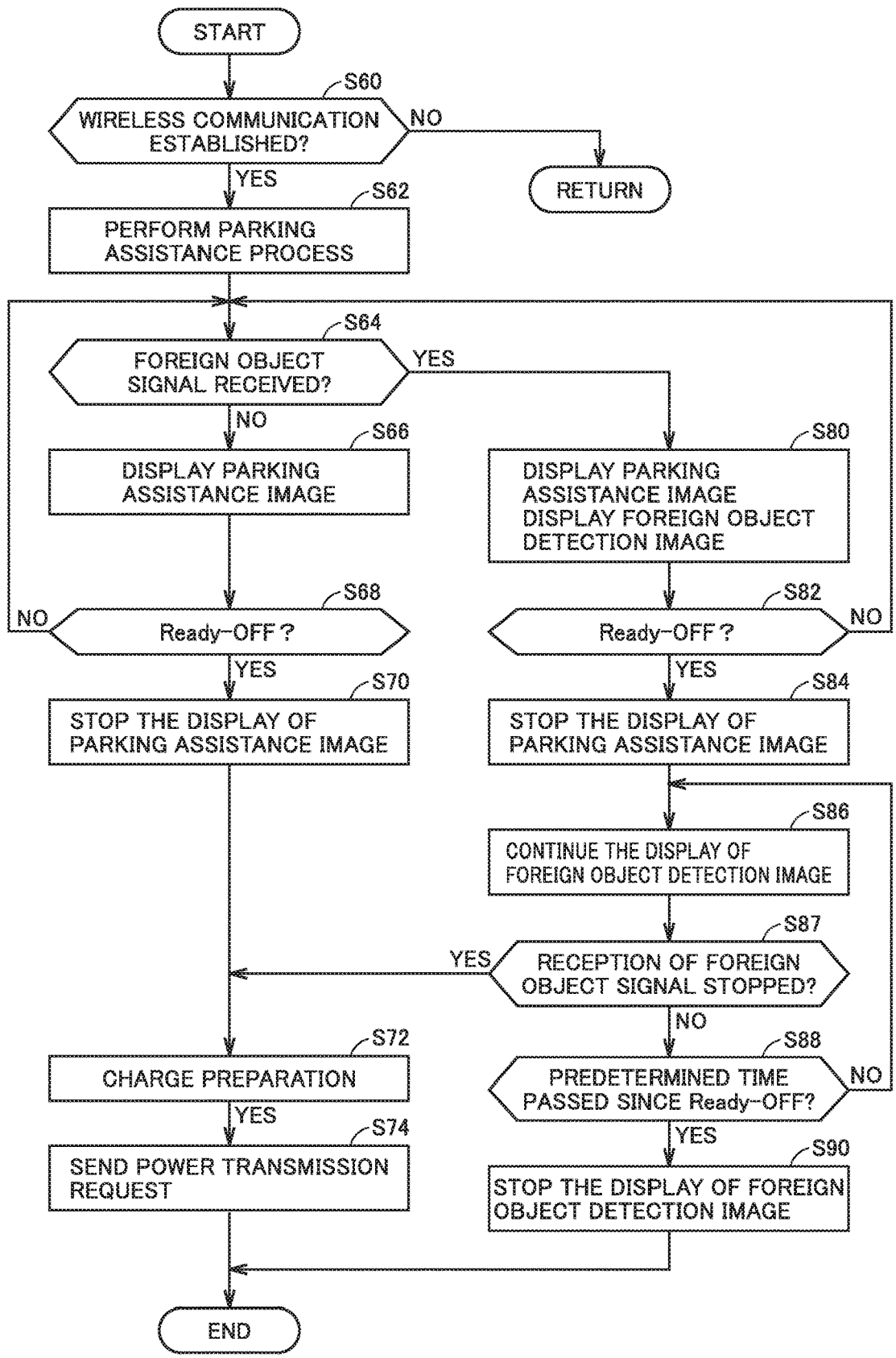
FIG. 6 is a flowchart illustrating an example process to be performed by a vehicle ECU.

FIG. 6 is a flowchart illustrating an example process to be performed by the vehicle ECU 360. This flowchart is initiated while the vehicle 1 is traveling (when the control system of the vehicle 1 is in the Ready-ON state).

The vehicle ECU 360 determines whether or not the wireless communication with the power transmission device 10 is established (step S60). If it is determined that the wireless communication with the power transmission device 10 is not established (NO in step S60), the vehicle ECU 360 skips the subsequent steps and advances the procedure to return.

If it is determined that the wireless communication with the power transmission device 10 is established (YES in step S60), the vehicle ECU 360 performs the parking assistance process described above (step S62). In other words, the vehicle ECU 360, based on the relative position information received from the power transmission device 10, displays a parking assistance image on the screen of the display device 380 so as to assist the parking of the vehicle 1 at the chargeable position.

Next, the vehicle ECU 360 determines whether or not a foreign object signal is received from the power transmission device 10 (step S64).

If it is determined that no foreign object signal is received (NO in step S64), the vehicle ECU 360 displays a parking assistance image Ip as illustrated in FIG. 3 on the screen of the display device 380 (step S66).

Thereafter, the vehicle ECU 360 determines whether or not the control system of the vehicle 1 is switched to the Ready-OFF state according to the user's operation (step S68). If it is determined that the state is not switched to the Ready-OFF state (NO in step S68), the vehicle ECU 360 returns the procedure to step S64.

When it is determined that the control system is switched to the Ready-OFF state (YES in step S68), the vehicle ECU 360 stops the display of the parking assistance image Ip (step S70), and prepares for the external charging (step S72). When the preparation for the external charging is completed, the vehicle ECU 360 sends a power transmission request to the power transmission device 10 (step S74). When the power transmission device 10 starts to transmit power in response to the power transmission request, the wireless external charging of the vehicle 1 is initiated.

On the other hand, if it is determined that a foreign object signal is received (YES in step S64), as illustrated in FIG. 3, the vehicle ECU 360 displays the parking assistance image Ip and the foreign object detection image Im on the screen of the display device 380 (step S80). The process of displaying the foreign object detection image Im on the screen of the display device 380 is equivalent to the foreign object notification process described above. Note that in step S80, it is acceptable to display only the foreign object detection image Im without displaying the parking assistance image Ip.

Thereafter, the vehicle ECU 360 determines whether or not the control system of the vehicle 1 is switched to the Ready-OFF state (step S82). If it is determined that the control system is not switched to the Ready-OFF state (NO in step S82), the vehicle ECU 360 returns the procedure to step S64.

If it is determined that the control system is switched to the Ready-OFF state (YES in step S82), the vehicle ECU 360 stops the display of the parking assistance image Ip (step S84), but continues the display of the foreign object detection image Im (step S86).

Thereafter, the vehicle ECU 360 determines whether or not the reception of the foreign object signal is stopped (step S87).

If it is determined that the reception of the foreign object signal is stopped (YES in step S87), the vehicle ECU 360 advances the procedure to step S72. In other words, the vehicle ECU 360 prepares for the external charging (step S72), and sends a power transmission request to the power transmission device 10 when the external charging preparation is completed (step S74). Thus, the external charging is initiated.

On the other hand, if it is determined that the reception of the foreign object signal is not stopped (NO in step S87), the vehicle ECU 360 determines whether or not a predetermined time has passed since the control system is switched to the Ready-OFF state (step S88). If it is determined that the predetermined time has not passed since the control system is switched to the Ready-OFF state (NO in step S88), the vehicle ECU 360 returns the procedure to step S86 and continues the display of the foreign object detection image Im.

If it is determined that the predetermined time has passed since the control system is switched to the Ready-OFF state (YES in step S88), the vehicle ECU 360 stops the display of the foreign object detection image Im (step S90).

As described above, in the wireless power transfer system according to the present embodiment, when the wireless communication is established between the power transmission device 10 and the vehicle 1, the power transmission ECU 250 initiates the foreign object detection process. When a foreign object is detected by the foreign object detection process, the vehicle ECU 360 displays the foreign object detection image Im on the screen of the display device 380 so as to notify the user that a foreign object is detected. Thus, the user may be notified that a foreign object is present over the power transmission coil 11 before the user gets off the vehicle 1, prompting the user to remove the foreign object. As a result, it is possible to restrain the external power transmission from being interrupted by the foreign object.

First Modification

In the embodiment above, as an example, it is described that when a foreign object is detected, the foreign object detection image Im is displayed on the display device 380.

However, in certain instances, it may be preferred to display another image on the display device 380 in addition to the foreign object detection image Im. Therefore, after a foreign object is detected, if the display of the other image is requested, the size of the foreign object detection image Im may be reduced so as to save an area to display the other image, or the foreign object detection image Im and the other image may be displayed alternately.

Figure 7:
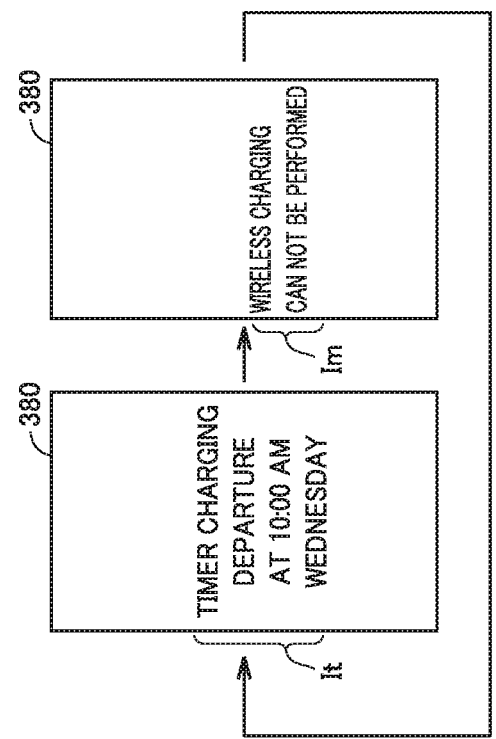
FIG. 7 is a diagram illustrating an example in which an image It indicating the setting contents of timer charging and a foreign object detection image Im are alternately displayed in a predetermined interval.

FIG. 7 diagram illustrating an example in which an image It indicating the setting contents of timer charging (external charging to be performed according to a predetermined schedule) and a foreign object detection image Im are alternately displayed in a predetermined interval until a predetermined time has passed since the control system is switched to the Ready-OFF state. As a result, the user may confirm that there is a foreign object above the power transmission coil 11 and the setting contents of the timer charging.

When the user of the vehicle 1 does not perform the wireless charging by using the power transmission device 10 (for example, when the user is performing a contact charging by using a charging cable connected to a contact charging device installed in the parking space together with the power transmission device 10), it is less necessary to display the foreign object detection image Im. Therefore, when it is obvious that the wireless charging is not performed (for example, when the user selects the contact charging instead of the wireless charging), the foreign object detection image Im may not be displayed.

Second Modification

In the embodiment above, as an example, it is described that when the wireless communication is established between the power transmission device 10 and the vehicle 1, the power transmission ECU 250 performs the relative position measurement process and the foreign object detection process. Therefore, the processing load of the power transmission ECU 250 is high, which requires a CPU having a high processing capacity. On the other hand, if the shift range is shifted to the P (parking) range or if the vehicle speed is less than the predetermined speed, the relative position of the vehicle 1 does not change rapidly and significantly, even if the update frequency of the relative position information by the relative position measurement process is low, no major problem may occur in the parking assistance process.

Thus, whether or not to perform the foreign object detection process may be determined according to the shift range or the vehicle speed. In other words, if the shift range is not shifted to the P range or if the vehicle speed is equal to or higher than the predetermined speed, the foreign object detection process may not be performed, whereas if the shift range is shifted to the P range or if the vehicle speed is less than the predetermined speed, the foreign object detection process may be performed. Thereby, it is possible to reduce the processing load of the power transmission ECU 250.

Further, the interval of performing the relative position measurement process (the frequency of updating the relative position information) may be changed according to the shift range or the vehicle speed. In other words, if the shift range is not shifted to the P range or if the vehicle speed is equal to or higher than the predetermined speed, the relative position measurement process may be performed in a relatively short first interval, and when the shift range is shifted to the P range or the vehicle speed is less than the predetermined speed, the relative position measurement process may be performed in a second interval longer than the first interval. Thereby, it is possible to reduce the processing load of the power transmission ECU 250.

Figure 8:
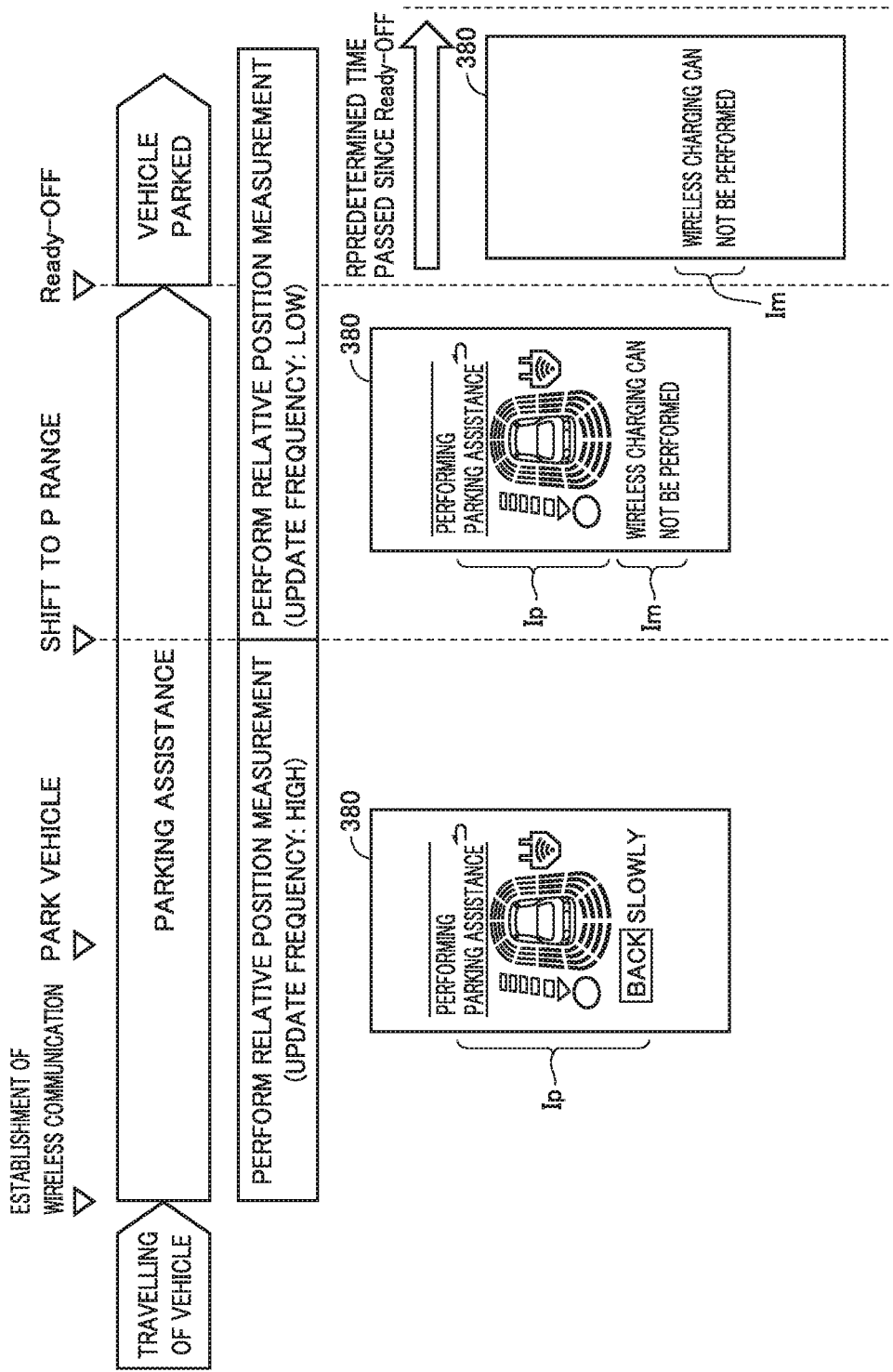
FIG. 8 is a diagram illustrating a modified example of screen transition of the display device when a foreign object is present over the power transmission coil.

FIG. 8 is a diagram illustrating a modified example of screen transition of the display device 380 when the vehicle 1 is parked at the chargeable position under such a condition that a foreign object is present over the power transmission coil 11. Note that in the example of FIG. 8, whether or not to perform the foreign object detection process is dependent on whether or not the shift range is shifted to the P range.

When the wireless communication is established between the vehicle 1 and the power transmission device 10, firstly, the relative position measurement process is performed in the power transmission device 10. If the shift range is not shifted to the P range, the vehicle 1 is travelling and the relative position of the vehicle 1 may change rapidly, the relative position measurement process is performed in a relatively short first interval. As a result, the frequency of updating the relative position information is high, which makes it possible to accurately perform the parking assistance process in the vehicle 1.

If the shift range is shifted to the P range, the vehicle 1 is parked and the relative position of the vehicle 1 does not change rapidly, and thus, the relative position measurement process may be performed in a relatively long second interval. Thereby, the frequency of updating the relative position information is low, which makes it possible to reduce the processing load of the power transmission ECU 250 for performing the relative position measurement process. Thus, the foreign object detection process is performed in a state where the processing load for performing the relative position measurement process is reduced. Therefore, the relative position measurement process and the foreign object detection process may be performed while restraining the processing load of the power transmission ECU 250 from increasing excessively.

FIG. 9 is a flowchart illustrating another example process to be performed by the power transmission ECU 250 according to the second modification. The flowchart illustrated in FIG. 9 is obtained by changing step S12 of the flowchart illustrated in FIG. 5 to step S12*b* and further adding steps S11 and S12*a* to the flowchart illustrated in FIG. 5. The other steps (that are denoted by the same numbers as the steps illustrated in FIG. 5) have already been described in the above, and the detailed description thereof will not be repeated.

When the wireless communication with the vehicle 1 is established (YES in step S10), the power transmission ECU 250 determines whether or not the shift range of the vehicle 1 is shifted to the P range (step S11).

If it is determined that the shift range is not shifted to the P range (NO in step S11), it means that the vehicle 1 is still in motion, the power transmission ECU 250 performs the position measurement process in a relatively short first interval so as to increase the frequency of updating the relative position information (step S12*a*). Thereafter, the power transmission ECU 250 advances the procedure to return.

On the other hand, if it is determined that the shift range is shifted to the P range (YES in step S11), it means that the vehicle 1 is parked, and the power transmission ECU 250 performs the position measurement process in a second interval that is longer than the first interval so as to decrease the frequency of updating the relative position information (step S12*b*), and then performs the foreign object detection process (step S14). Therefore, the relative position measurement process and the foreign object detection process may be performed while restraining the processing load of the power transmission ECU 250 from increasing excessively.

FIG. 10 is a flowchart illustrating another example process to be performed by the power transmission ECU 250 according to the second modification. The flowchart illustrated in FIG. 10 is obtained by changing step S11 of the flowchart illustrated in FIG. 9 to step S11*a*.

When the wireless communication with the vehicle 1 is established (YES in step S10), the power transmission ECU 250 determines whether or not the vehicle speed is less than the predetermined speed (step S11*a*).

If it is determined that the vehicle speed is not less than the predetermined speed (NO in step S11*a*), the power transmission ECU 250 performs the relative position measurement process in a relatively short first interval (step S12*a*). On the other hand, if it is determined that the vehicle speed is less than the predetermined speed (YES in step S11*a*), the power transmission ECU 250 performs the relative position measurement process in a second interval that is longer than the first interval (step S12*b*), and then performs the foreign object detection process (step S14). Therefore, the relative position measurement process and the foreign object detection process may be performed while restraining the processing load of the power transmission ECU 250 from increasing excessively.

Third Modification

In the embodiment above, as an example, it is described that the foreign object detection process is initiated when the wireless communication is established between the power transmission device 10 and the vehicle 1. In the second modification above, it is described that the foreign object detection process is performed when the shift range is shifted to the P range or when the vehicle speed is less than the predetermined speed after the wireless communication is established between the power transmission device 10 and the vehicle 1.

However, the timing for starting the foreign object detection process may be any timing in a duration after the wireless communication is established between the power transmission device 10 and the vehicle 1 and before the user of the vehicle 1 gets off and leaves the vehicle 1. For example, after the wireless communication is established between the power transmission device 10 and the vehicle 1, the foreign object detection process may be started at the timing when the control system of the vehicle 1 is switched to the Ready-OFF state by the user.

Fourth Modification

In the embodiment above, as an example, it is described that the foreign object notification process is performed at the timing when the foreign object is detected by the foreign object detection process.

However, the timing at which the foreign object notification process is performed is not limited, it may be any timing in a duration after the foreign object is detected by the foreign object detection process and before the user of the vehicle 1 gets off and leaves the vehicle 1. For example, if a foreign object is detected by the foreign object detection process, a sound that is different from the normal door locking sound may be output at the timing when the user of the vehicle 1 gets off the vehicle 1 and locks the door. In this way, it is possible to notify the user that a foreign object is present over the power transmission coil 11 before the user leaves the vehicle 1.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A notification system applicable to a wireless power transfer system configured to transmit power in a wireless manner from a power transmission coil of a power transmission device provided in a parking space to a power reception coil mounted on a vehicle, the notification system comprising:
   a notification device configured to notify a user of the vehicle of a piece of information; and
   a controller configured to control the notification device,
   the power transmission device and the vehicle being configured to establish a wireless communication with each other when a distance between the power transmission device and the vehicle is less than a predetermined distance,
   the controller being configured to perform a notification process so as to cause the notification device to notify the user of the vehicle of a first information when a foreign object is detected over the power transmission coil at any timing in a duration after the wireless communication is established between the power transmission device and the vehicle and before the user of the vehicle gets off and leaves the vehicle,
   wherein, when a control system of the vehicle is deactivated during the notification process, the controller is configured to continuously perform the notification process until a predetermined time has elapsed since the control system of the vehicle is deactivated.

2. The notification system according to claim 1, wherein the first information includes information for notifying the user of the vehicle at least one of an event that it is impossible to transmit power from the power transmission coil and an event that a foreign object is present over the power transmission coil.

3. The notification system according to claim 1, wherein the wireless power transfer system includes a detection device configured to detect a foreign object that is present over the power transmission coil,
   the controller is configured to
   initiate a detection process to determine whether or not a foreign object is present based on an output of the detection device at any timing in a duration after the wireless communication is established between the power transmission device and the vehicle and before the user of the vehicle leaves the vehicle, and
   perform the notification process when a foreign object is detected by the detection process.

4. The notification system according to claim 3, wherein the controller is configured to initiate the detection process when the wireless communication is established between the power transmission device and the vehicle.

5. The notification system according to claim 3, wherein the controller is configured to initiate the detection process when a first condition is satisfied after the wireless communication is established between the power transmission device and the vehicle,
   the first condition includes a condition that a shift range of the vehicle is a parking range or a condition that a vehicle speed is less than a predetermined speed.

6. The notification system according to claim 3, wherein the controller is configured to perform a measurement process to periodically measure a relative position between the power transmission coil and the power reception coil,
   in a state where the wireless communication is established between the power transmission device and the vehicle, the controller is configured to
   perform the measurement process in a first interval when a first condition is not satisfied, and
   perform the measurement process together with the detection process in a second interval which is longer than the first interval when the first condition is satisfied,
   the first condition includes a condition that a shift range of the vehicle is a parking range or a condition that a vehicle speed is less than a predetermined speed.

7. A notification method applicable to a wireless power transfer system configured to transmit power in a wireless manner from a power transmission coil of a power transmission device provided in a parking space to a power reception coil mounted on a vehicle,
   the power transmission device and the vehicle being configured to establish a wireless communication with each other when a distance between the power transmission device and the vehicle is less than a predetermined distance,
   the notification method including:
   determining whether or not a foreign object is detected over the power transmission coil at any timing in a duration after the wireless communication is established between the power transmission device and the vehicle and before a user of the vehicle gets off and leaves the vehicle; and
   notifying the user of the vehicle of a first information when it is determined that the foreign object is detected over the power transmission coil,
   wherein, when a control system of the vehicle is deactivated during the notification method, the notification method is continually performed until a predetermined time has elapsed since the control system of the vehicle is deactivated.

* * * * *